R. J. SCHMIDT.
HEAT REFLECTING AND RETAINING DEVICE.
APPLICATION FILED DEC. 2, 1920.

1,413,620.  Patented Apr. 25, 1922.

INVENTOR
Robert J. Schmidt
BY J. S. Prenner
ATTORNEY.

WITNESS:

UNITED STATES PATENT OFFICE.

ROBERT J. SCHMIDT, OF PHILADELPHIA, PENNSYLVANIA.

HEAT REFLECTING AND RETAINING DEVICE.

1,413,620.   Specification of Letters Patent.   Patented Apr. 25, 1922.

Application filed December 2, 1920. Serial No. 427,899.

*To all whom it may concern:*

Be it known that I, ROBERT J. SCHMIDT, a citizen of the United States, and a resident of Philadelphia, in the county of Philadelphia and State of Pennsylvania, have invented a new and useful Heat Reflecting and Retaining Device, of which the following is a specification.

This invention relates to devices adapted to throw the heat rising from a heated article onto the article and to prevent said heat from being dissipated.

With the above and related objects in view, the invention comprises the construction, combination and arrangement hereinafter described, an embodiment whereof is illustrated in the accompanying drawing, and is embraced within the scope of the appended claims.

In the said drawing:—

In the said drawing, 4 represents a closure, preferably made of sheet metal, such as tin; 5 is a top; 6 is a joint between the top and closure; 7 is a disc of insulating material, such as asbestos or the like; 8 is a reflector, consisting of a metal disc provided with a bright or polished surface, which reflector may be of tin and copper plated where it is exposed to heat and moisture to retain its polish; 9 is a wire adapted to expand within the seat or bead 10 of the closure; and 11 represents the means for handling the device.

Figure 1:
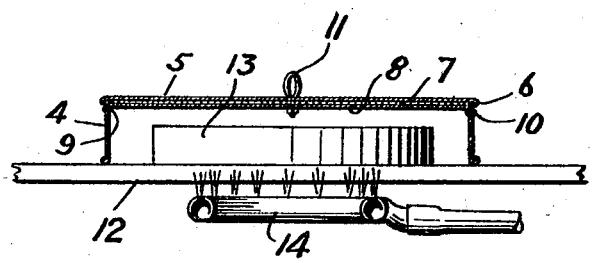
Figure 1 is a sectional elevation of my device.
Figure 2:
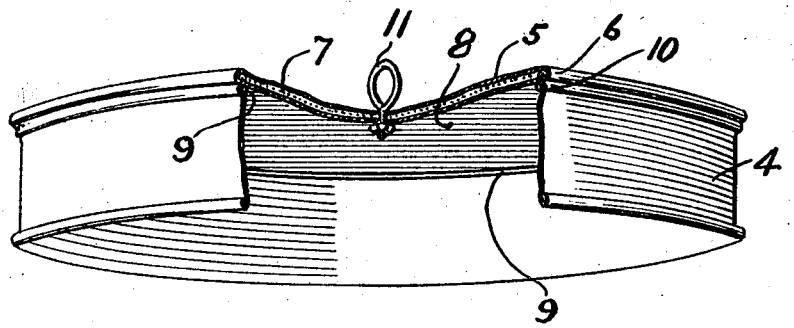
Figure 2 is a perspective view thereof.
Figure 3:
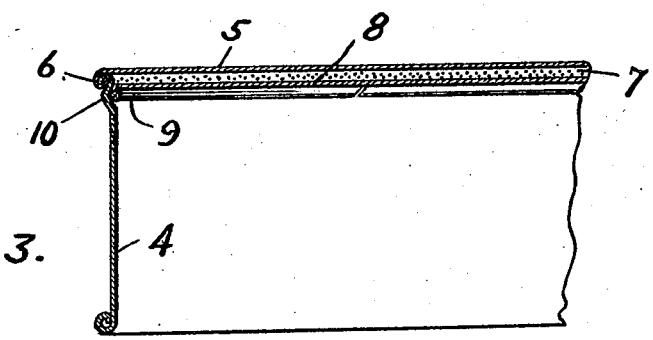
Figure 3 is an enlarged sectional view of a portion thereof.

As shown in Figure 1, the device is mounted on a gas grid 12 over an iron or stone 13, heated by a gas burner 14.

The iron or stone 13, is intended to supply heat for fireless cooker, and to properly serve its purpose of supplying the heat necessary for cooking it should be heated to a comparatively high temperature. When an iron of this character is heated while exposed to the temperature of an ordinary kitchen, it takes considerable time to raise its temperature, since considerable of the heat is radiated from its surface opposite the surface to which the heat of the burner is applied. Furthermore, the exposed surface is bound to be of a lower temperature than the heated surface. When such heated iron is removed from the burner and placed within the fireless cooker, the temperature of the iron is lowered by the equalization of the heat between its two surfaces.

By covering the iron with my reflector, as shown in Figure 1 the heat rising from the iron strikes the reflecting disc and is thrown back onto the iron, the asbestos disc on top of the reflecting disc preventing any of the heat, which strikes the reflecting disc, from dissipating by radiation.

I have hereinbefore described the application of my device in connection with a fireless cooker iron or stone. It may also be used advantageously for other purposes, such as covers for flat irons, hot dishes, fireless cookers, etc.

What I claim is—

1. A heat reflecting and retaining device comprising a hood adapted to be mounted over a heated object to separate it from the surrounding atmosphere, said hood provided with a top, a heat reflector inside the hood under the top, a heat insulator intermediate the reflector and top, a resilient ring under the reflector adapted to bear against the hood to retain the reflector in a fixed position.

2. The combination claimed in claim 1, said hood provided with a continuous bight under the reflector as a seat for the ring.

3. The combination claimed in claim 2, said ring being split and normally of a diameter to register with the bight of the hood, the resiliency of the ring tending to spread it at the split, and adapted to have its diameter reduced when its ends are forced to contact for its removal from the hood.

ROBERT J. SCHMIDT.